(12) United States Patent
Hu et al.

(10) Patent No.: US 11,106,896 B2
(45) Date of Patent: Aug. 31, 2021

(54) METHODS AND APPARATUS FOR MULTI-TASK RECOGNITION USING NEURAL NETWORKS

(71) Applicant: INTEL CORPORATION, Santa Clara, CA (US)

(72) Inventors: Ping Hu, Beijing (CN); Anbang Yao, Beijing (CN); Yurong Chen, Beijing (CN); Dongqi Cai, Beijing (CN); Shandong Wang, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/958,542

(22) PCT Filed: Mar. 26, 2018

(86) PCT No.: PCT/CN2018/080507
§ 371 (c)(1),
(2) Date: Jun. 26, 2020

(87) PCT Pub. No.: WO2019/183758
PCT Pub. Date: Oct. 3, 2019

(65) Prior Publication Data
US 2021/0004572 A1  Jan. 7, 2021

(51) Int. Cl.
*G06F 3/01* (2006.01)
*G06K 9/00* (2006.01)
(Continued)

(52) U.S. Cl.
CPC .......... *G06K 9/00288* (2013.01); *G06F 3/011* (2013.01); *G06F 3/017* (2013.01);
(Continued)

(58) Field of Classification Search
None
See application file for complete search history.

(56) References Cited

U.S. PATENT DOCUMENTS

| 7,369,686 | B2 * | 5/2008 | Yokono ............. | G06K 9/00221 382/118 |
| 9,031,293 | B2 * | 5/2015 | Kalinli-Akbacak .... | G06F 3/011 382/128 |

(Continued)

FOREIGN PATENT DOCUMENTS

| CN | 105894050 A | 8/2016 |
| CN | 106384098 A | 2/2017 |

(Continued)

OTHER PUBLICATIONS

Google Translation of CN-110197468-A (Year: 2019).*
(Continued)

*Primary Examiner* — Soo Shin
(74) *Attorney, Agent, or Firm* — Hanley, Flight & Zimmerman, LLC

(57) ABSTRACT

Methods and apparatus for multi-task recognition using neural networks are disclosed. An example apparatus includes a filter engine to generate a facial identifier feature map based on image data, the facial identifier feature map to identify a face within the image data. The example apparatus also includes a sibling semantic engine to process the facial identifier feature map to generate an attribute feature map associated with a facial attribute. The example apparatus also includes a task loss engine to calculate a probability factor for the attribute, the probability factor identifying the facial attribute. The example apparatus also includes a report generator to generate a report indicative of a classification of the facial attribute.

25 Claims, 10 Drawing Sheets

(51) Int. Cl.
 *G06K 9/62* (2006.01)
 *G06N 3/08* (2006.01)

(52) U.S. Cl.
 CPC .......... *G06N 3/08* (2013.01); *G06F 2203/011* (2013.01); *G06K 2009/00322* (2013.01)

(56) References Cited

U.S. PATENT DOCUMENTS

| | | | |
|---|---|---|---|
| 10,565,758 B2* | 2/2020 | Hadap | G06N 3/0454 |
| 10,671,838 B1* | 6/2020 | Bogan, III | G06T 13/80 |
| 10,692,602 B1* | 6/2020 | Nguyen | G16H 50/20 |
| 2004/0126008 A1* | 7/2004 | Chapoulaud | G06K 9/00127 |
| | | | 382/156 |
| 2014/0079297 A1* | 3/2014 | Tadayon | G06K 9/00288 |
| | | | 382/118 |
| 2016/0379041 A1* | 12/2016 | Rhee | G06K 9/6296 |
| | | | 382/118 |
| 2017/0344808 A1 | 11/2017 | El-Khamy et al. | |

FOREIGN PATENT DOCUMENTS

| | | |
|---|---|---|
| CN | 107194347 A | 9/2017 |
| CN | 107239736 A | 10/2017 |
| CN | 107247940 A | 10/2017 |
| CN | 110197468 A * | 9/2019 |

OTHER PUBLICATIONS

International Searching Authority, "International Search Report," dated Dec. 29, 2018 in connection with International Patent Application No. PCT/CN2018/080507, 5 pages.
International Searching Authority, "Written Opinion," dated Dec. 29, 2018 in connection with International Patent Application No. PCT/CN2018/080507, 4 pages.

* cited by examiner

METHODS AND APPARATUS FOR MULTI-TASK RECOGNITION USING NEURAL NETWORKS

FIELD OF THE DISCLOSURE

This disclosure relates generally to facial analysis, and, more particularly, to methods and apparatus for multi-task recognition using neural networks.

BACKGROUND

In recent years, facial analysis techniques have evolved. Such facial analysis techniques are directed to single, face-related tasks. For example, facial analysis techniques utilize neural networks to identify an emotion of an individual or a single facial attribute (e.g., facial hair, eye color, gender, etc.).

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
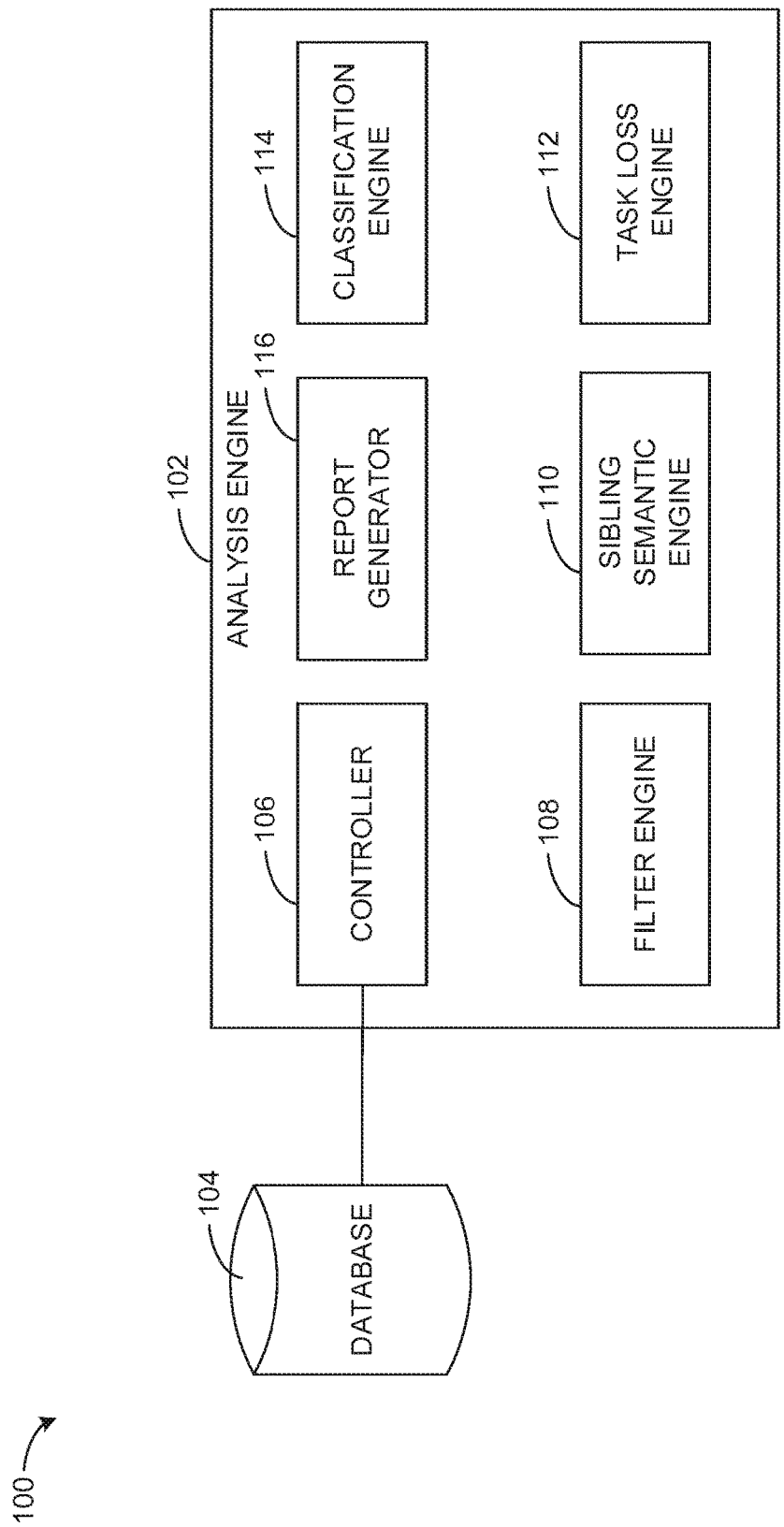
FIG. 1 illustrates an example environment in which facial analysis for multi-task recognition may be performed.

Facial analysis includes many different tasks, including emotion recognition (e.g., angry, sad, happy, etc.), facial attributes recognition (e.g., gender, age, hat, race, hair style, etc.) and so on. Emotions and facial attributes are different powerful means for humans to regulate communication with each other and interaction with the environment. These multiple tasks' features allow for much more understandable descriptions of people and activities. The features serve as indispensable components in many computer vision systems and related fields including perceptual user interface, smart robotics, learning and edutainment, and so forth.

For single-task facial analysis, like emotion recognition or face attributes recognition, known methods are based on deep learning, for example. However, these known methods can only deal with one task for emotion recognition or only handle one facial attribute classification task, and cannot solve multi-task face analysis problems effectively.

Disclosed herein is an efficient, unified Convolutional Neural Network (CNN) framework for multiple-task facial analysis. The disclosed examples are directed to a unified CNN architecture for multi-task facial analysis. Utilizing one efficient, single CNN framework, detailed features are efficiently and more robustly determined. Disclosed examples also include sibling sematic blocks designed to present unique characteristics for each multi-task facial analysis. For example, different receptive fields are chosen in convolutional neural networks to fit different tasks' properties. In examples disclosed herein, the sibling semantic blocks include a holistic-face aware semantic block, a local-part aware semantic block and a hybrid-coupled semantic block. The sibling sematic blocks determine characteristics for each task. For example, a holistic-face aware semantic block, a local-part aware semantic block and a hybrid-coupled semantic block determine different kinds of face tasks based on the properties of the semantic block. Each semantic block operates in tandem with other semantic blocks to establish feature level relationships based on the semantic block inner connections. For example, one semantic block may determine that facial hair is present, which may increase a weighting function of another semantic block that determines gender. Each sibling semantic block is utilized for different kinds of face tasks based on the sibling semantic blocks properties. Additionally, the sibling semantic blocks establish relationships by the inner connections of certain properties determined in the feature level.

Disclosed examples also include a multi-task loss and lightweight network model for training and reference. The end-to-end network of the disclosed examples can be operated based on the multi-task loss function design. As only one CNN network within this framework extracts features, and sibling semantic blocks are designed to abstract semantic information, the model size is small. As such, the multi-task loss function combines relationships of multiple tasks in the decision level, accelerating convergence in the training process. Additionally, the multi-task loss is designed and a lightweight network model is built for training and reference. The multi-task loss establishes an end-to-end network and also provides a way to build relationships of multi-task in decision level. The efficient single CNN disclosed herein reduces the number of parameters rather than combing multiple networks. Combining relationships from the sibling semantic blocks and the multi-loss function increases processing efficiency, increases accuracy of results and accelerates convergence.

Disclosed herein is an example apparatus for dynamic multi-task facial analysis. The example apparatus includes a filter engine to generate a facial identifier feature map based on image data. The example facial identifier feature map is to identify a face within the image data. For example, the filter engine may perform face localization/detection on a frame of a video sequence. The filter engine may also perform facial landmarking to determine facial points (e.g., corner of mouth, edge of face, etc.). The example filter engine may also perform any pre-processing techniques necessary prior to performing facial analyses techniques disclosed herein. The example filter engine may generate the facial identifier feature map using a phase-convolution engine, a phase-residual engine and an inception-residual engine. In examples disclosed herein, the phase-convolution engine, the phase-residual engine and the inception-residual engine are utilized for building lower, middle, and top layers of a CNN.

The example apparatus also includes a sibling semantic engine to process the facial identifier feature map to generate an attribute feature map associated with a facial attribute. For example, the sibling semantic engine may process the facial identifier feature map to generate an attribute feature map for curly hair. The example sibling semantic engine generates the attribute feature map using a face semantic engine, a local-part semantic engine or a hybrid coupled semantic engine. In some examples, the face semantic engine convolves the facial identifier feature map to identify at least gender or age. The example face semantic engine may convolve the facial identifier map using at least one of a 1×1 filter or a 7×7 filter. In some examples, the example local-part semantic engine convolves the facial identifier map to identify accessory attributes (e.g., hat, glasses, etc.). The example local-semantic engine may convolve the facial identifier map using at least one of a 1×1 filter, 3×3 filter, 5×5 filter or a concatenate layer. In some examples, the example hybrid coupled semantic engine convolves the facial identifier map to identify emotions (e.g., happy, sad, angry, etc.). The example hybrid coupled engine may convolve the facial identifier map using at least one of a 1×1 filter, 3×3 filter, convolve down, a fully connected layer or a concatenate layer.

The example apparatus also includes a task loss engine to calculate a probability factor (e.g., loss value) for the attribute, the probability factor is utilized to identify the facial attribute (e.g., emotion, gender, accessory, etc.). In some examples, the probability factor calculated by the task loss engine is used to train the sibling semantic engine and/or the filter engine. The example apparatus classifies a plurality of features in real-time.

FIG. 1 illustrates an example environment 100 in which facial analysis for multi-task recognition may be performed. The example environment 100 includes an example analysis engine 102 and an example database 104. The example analysis engine 102 includes an example controller 106, an example filter engine 108, an example sibling semantic engine 110, an example task loss engine 112, an example classification engine 114, and an example report generator 116.

In the illustrated example of FIG. 1, the analysis engine 102 receives image data and/or video data for processing from the database 104 to perform facial analysis. The database 104 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 104 may additionally or alternatively be implemented by one or more double data rate (DDR) memories, such as DDR, DDR2, DDR3, mobile DDR (mDDR), etc. The database 104 may additionally or alternatively be implemented by one or more mass storage devices such as hard disk drive(s), compact disk drive(s) digital versatile disk drive(s), etc. While in the illustrated example the database 104 is illustrated as a single database, the database 104 may be implemented by any number and/or type(s) of databases. Furthermore, the data stored in the database 104 may be in any data format such as, for example, binary data, comma delimited data, tab delimited data, structured query language (SQL) structures, etc. Alternatively, the analysis engine 102 may receive image data and/or video data for processing from another source via a network (not shown).

In the illustrated example of FIG. 1 the controller 106 receives image data and/or video data (e.g., media data) for processing from the database 104. The example controller 106 may perform pre-processing steps on the media data prior to facial analysis. For example, the controller 106 may perform face localization/detection in a first frame of a video sequence. Face localization may be performed on an arbitrary, unconstrained image to determine the location of the face that initially appears in a video. Determining the precise placement of the face determines the location of relevant information for processing by the filter engine 108, the sibling semantic engine 110, the task loss engine 112 and/or the classification engine 114. In some examples, face localization/detection is followed by facial landmark point tracking. In facial landmark point tracking, a bounding box may be applied to the face and various features or landmarks of the face are determined and tracked. Landmarks are often a set of fiducial facial points, usually located on the corners, tips or mid points of the facial components such as the eyes, nose, lips and mouth. The landmarks may be determined by shape regression techniques such as Explicit Shape Regression (ESR) and Supervised Decent Method (SDM). Face frontalization comprises synthesizing frontal facing views of faces appearing in single unconstrained photos. During face frontalization, usually a 3D face model is adopted for registration and warping. In some examples, illumination compensation may be performed to enable dynamic emotion recognition in a variety of lighting conditions by compensating for and normalizing lighting conditions. After the media data has been processed by the controller 106, the processed media data may be sent to the filter engine 108. Alternatively, the controller 106 may not pre-process the media data and may send the media data directly to the filter engine 108 for facial analysis.

The filter engine 108 analyzes the media data from the controller 106 to generate feature maps for further processing. The filter engine 108 is described in more detail below in connection with FIG. 2.

The features maps from the filter engine 108 are sent to the sibling semantic engine 110 for further processing. The example sibling semantic engine 110 analyzes the feature maps from the filter engine 108 and generates specific feature maps for each facial attribute recognition task. For example, the sibling semantic engine 110 may have 5 task associated with a multi-task facial analysis (e.g., gender, hair color, glasses, hat, etc.). As such, the sibling semantic engine 110 may generate 5 individual feature maps for each specific facial attribute. The sibling semantic engine 110 is described in more detail below in connection with FIG. 2.

The example task loss engine 112 receives the individual feature maps from the sibling semantic engine 110 and generates an output value (e.g., a loss value) indicative of the facial feature for the individual feature map. For example, for a feature map "has hat?" the task loss engine 112 may generate an output value of 0, for no hat, or 1, for has hat. Additionally, the task loss engine 112 may generate an output value between 0-N for emotion feature maps. The task loss engine 112 is described in more detail below in connection with FIG. 2.

The example classification engine 114 receives the output values from the task loss engine 112 and classifies each image. For example, the classification engine 114 may populate a packet with a determination of all the facial attributes from the task loss engine 112. For example, the classification engine 114 may populate a "has hat?" category with "has hat" based on an output value of 1 received from the task loss engine 112. Additionally, the classification engine 114 may populate an emotion category with "happy" based on an output value of 5 received from the task loss engine 112. However, any other form of classification may be used by the classification engine 114 to classify the media data based on the output values from the task loss engine 112. Once all the facial attributes have been classified, the classification engine 114 may send the classifications associated with the media data to the database 104 for storage. Alternatively, the classification engine 114 may send the classifications associated with the media data to the report generator 116 to generate a report. For example, the report generator 116 may generate a report indicative of the classifications for a multi-task recognition. The classification engine 114 is described in more detail below in connection with FIG. 2.

Figure 2:
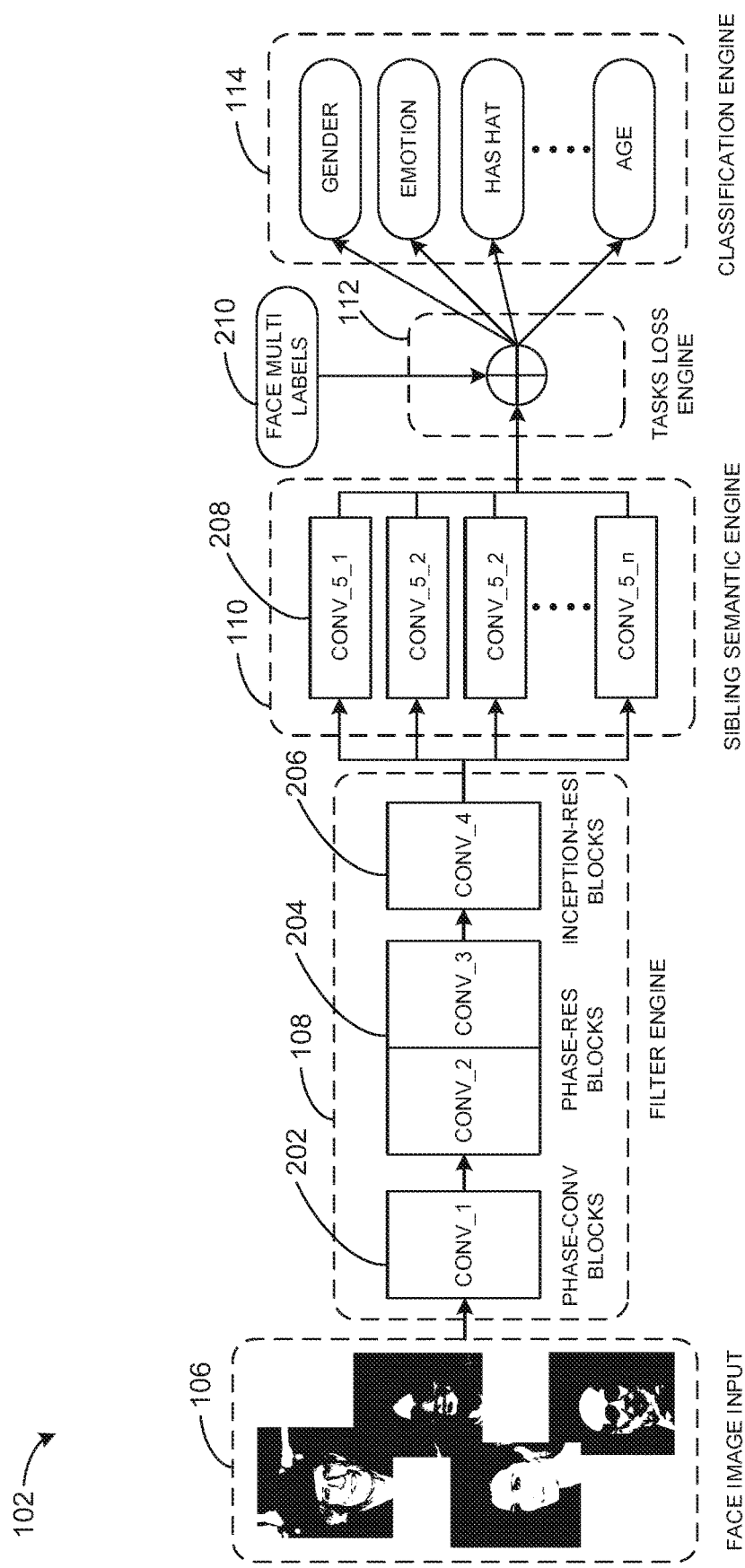
FIG. 2 is a block diagram illustrating an example implementation of the analysis engine of FIG. 1.

FIG. 2 is a block diagram illustrating an example implementation of the analysis engine 102 of FIG. 1. In the illustrated example, the controller 106 either pre-processes the media data received from the database 104 and/or sends the media data directly to the filter engine 108 for analysis without pre-processing the media data.

The filter engine 108 incorporates three techniques for building lower, middle, and top layers of the CNN, resulting in a deep yet computationally efficient CNN. These techniques include a phase-convolution block 202, phase-residual blocks 204, and an inception-residual block 206. The filters in the lower convolutional layers of the filter engine 108 form pairs in phase. Thus, the filters of the lower convolutional layers contain considerable redundancy, and the number of filters can be reduced but the accuracy of the whole network is improved through modifying the activation scheme. To reduce redundant filters and enhance their non-saturated non-linearity in the lower convolutional layers, the phase-convolution block 202 is used for building lower layers of the CNN, such as a composite convolutional layer, denoted as conv_1 in FIG. 2.

The phase-residual blocks 204 are to employ a deep residual learning variant. The layers generated by the phase-residual blocks 204 may learn residual functions with reference to the layer inputs, instead of learning unreferenced functions to create a residual network. The middle layers of the filter engine 108 are built using this residual network, resulting in two composite convolutional layers, denoted as conv_2 and conv_3 in FIG. 2. The residual layers result in a considerably increased depth of the CNN while maintaining efficiency. Residual layers employ residual learning, wherein the layers are explicitly stacked to fit a residual mapping, instead of guessing that the layers will fit a desired underlying mapping. The convolutional layers of the phase residual blocks have mostly 3×3 filters and follow two simple design rules: (i) for the same output feature map size, the layers have the same number of filters; and (ii) if the feature map size is halved, the number of filters is doubled so as to preserve the time complexity per layer.

The inception-residual block 206 builds the top layers of the filter engine 108, resulting in a composite convolutional layer, denoted as conv_4 in FIG. 2. The inception-residual block 206 broadens the network width and introduces multi-scale feature extraction property. The multi-scale feature extraction scheme results in a performance improvement in dynamic emotion recognition. In some examples, the filter engine 108 may be any one or more of the embodiments disclosed in Patent Cooperation Treaty Application No. PCT/CN2017/071950 filed on Jan. 20, 2017, titled "DYNAMIC EMOTION RECOGNITION IN UNCONSTRAINED SCENARIOS" which is hereby incorporated by reference in its entirety. The output of the filter engine 108 is a multi-scale feature map that is utilized by the sibling semantic engine 110.

The sibling semantic engine 110 receives the multi-scale feature map from the filter engine 108. The sibling semantic engine 110 generates sibling semantic blocks 208 structured to the facial analysis task. For example, because each facial analysis task has its own characteristic, one particular arrangement of sibling semantic blocks 208 in the sibling semantic engine 110 will not produce efficient results for every facial analysis task. Tasks related to facial areas vary. For example, some tasks are related to the whole face range (e.g., gender or age), while some tasks are only related to part of face (e.g., nose style or has glasses). Additionally, the tasks have different degrees of features detail. For example, hair color tasks are only concerned with hair color, while tasks related to glasses are related to both color and texture. Thus, the sibling semantic engine 110 determines different receptive fields in the sibling semantic blocks 208 with distinct network structures to capture these difference. The complexity within each sibling semantic block 208 varies. For example, "has hat" has two status, each of which is easy to tell. While emotion recognition has many status, angry, disgust, fear, happy, neutral, sad, surprise etc., and is more difficult than "has hat" to identify. Therefore multi-task recognition requires a more complex composition strategy to handle emotion recognition tasks. As shown in FIG. 2, sibling semantic blocks 208, denoted as conv_5_1, conv_5_2 . . . conv_5_n, can range from any number from 1-N based on the specific facial analysis task. Alternatively, some tasks may utilize the same semantic block 208. For example, if there are 6 recognition tasks, gender, glasses, emotion, hat, hair style, hair color. The first 5 tasks vary beyond a threshold. But hair style and hair color recognition tasks both consider the hair properties, but different aspects. As such, they can utilize the same sibling semantic block 208, reducing the amount of sibling semantic blocks 208 in the sibling semantic engine 110 from 6 to 5 for this facial analysis, which increases the overall efficiency associated with the CNN and reduces processing power. The output of the sibling semantic engine 110 is a specific feature map for the recognition tasks. For example, if there are 6 recognition tasks, gender, glasses, emotion, hat, hair style, hair color, the sibling semantic engine 110 outputs 6 feature maps for each recognition task. The sibling semantic engine 110 is described in more detail below in connection with FIGS. 3A-3C.

To train and/or update the sibling semantic engine 110, the example analysis engine 102 includes the example task loss engine 112. The example task loss engine 112 computes an example loss value (e.g., output value) that represents the errors reflected between the feature maps from the sibling semantic engine 110 and face multi labels 210 received from the database 104. The loss value is provided to the classification engine 114. The classification engine 114 updates its coefficients based on the loss value from the task loss engine 112. In some examples, the classification engine 114 uses a stochastic gradient descent algorithm or method to update the coefficients to reduce the loss value. The task loss engine 112 may utilize any number of loss functions, such as Euclidean Loss, Hinge Loss, Softmax Loss, etc. In the illustrated example, the task loss engine 112 determines loss values by assigning the feature maps from the sibling semantic engine 110 as loss1, loss2, loss3, . . . , lossN, for N face analysis tasks (N>=1). An example loss function can be expressed mathematically as:

$$loss = \alpha 1 * loss_1 + \alpha 2 * loss_2 + \ldots + \alpha N * loss_N = \Sigma_{i=1}^{N} \alpha i * loss_i$$

$$\Sigma_{i=1}^{N} \alpha i = 1, \quad 0 \leq \alpha i \leq 1$$

In the loss equation above, $\alpha i$ is the weighted parameter for each loss function loss_i. This loss formula fuses all the losses of different tasks in a unified way, providing the fusion strategy in the decision level. From forward and backward processes of training, the task loss engine 112 can learn the related parameters and build the relationships of multi tasks in the loss decision level.

The classification engine 114 updates its coefficients and/or weights based on the loss value from the task loss engine 112. The classification engine 114 may use any number of algorithms or methods to update the coefficients and/or weights to reduce the loss value to increase the accuracy of the classifications. Further, the classification engine 114 generates a classification (e.g., gender, emotion, has hat, etc.) based on the loss value from the task loss engine 112.

Figure 3A:
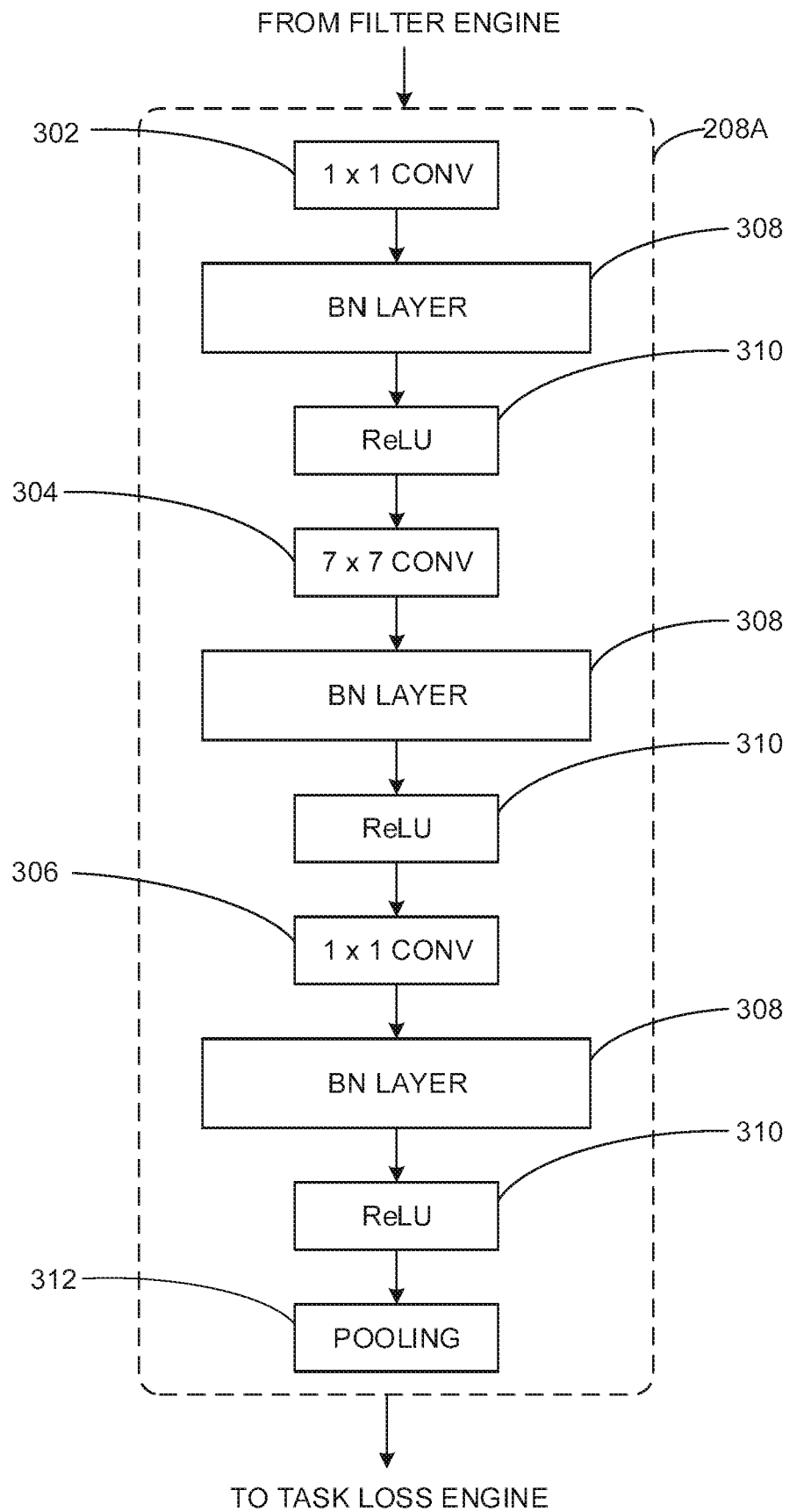
FIGS. 3A-3C illustrate example sibling semantic blocks that implement the example sibling semantic engine illustrated in FIGS. 1 and 2.
Figure 3B:
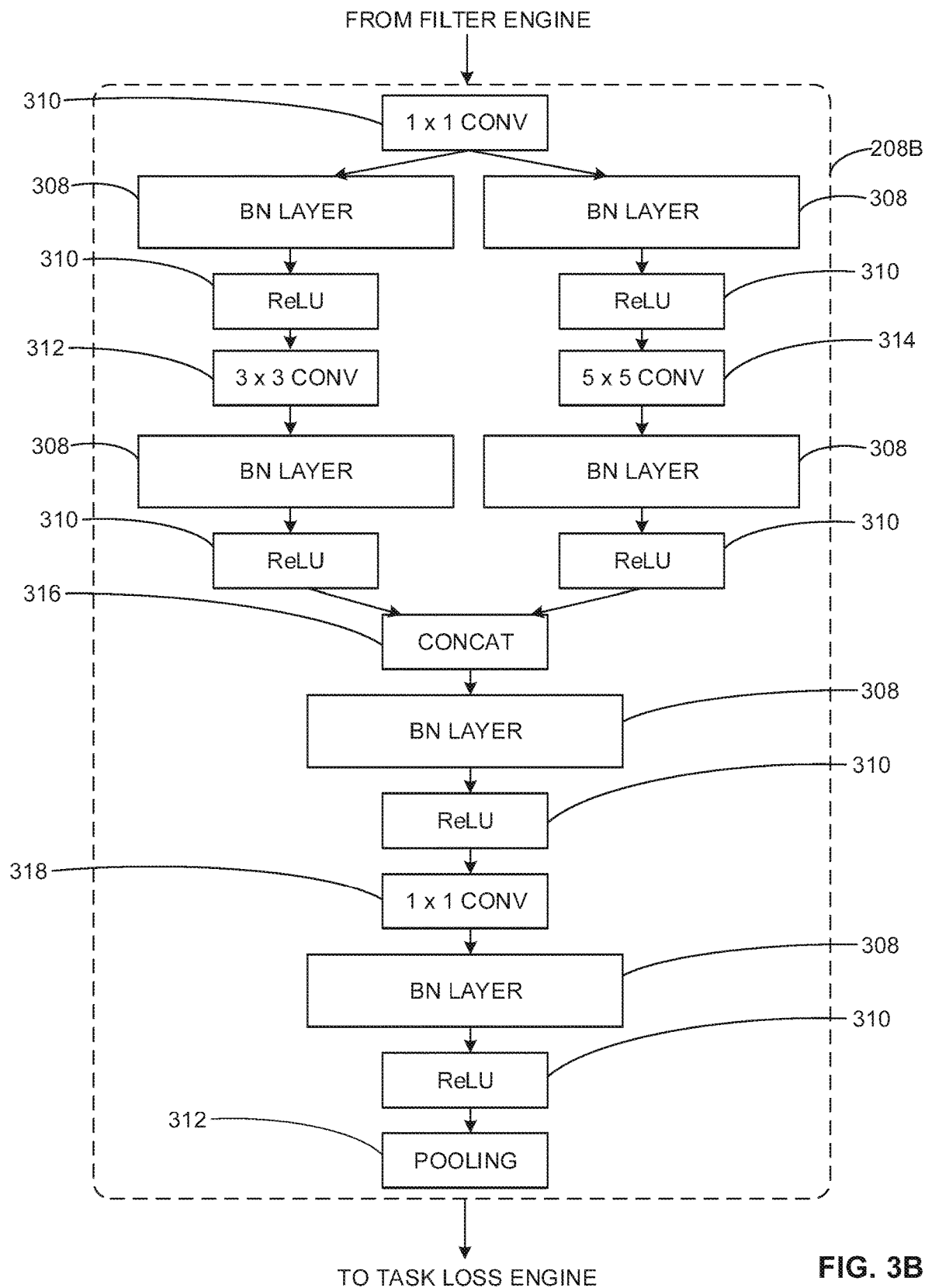
Figure 3C:
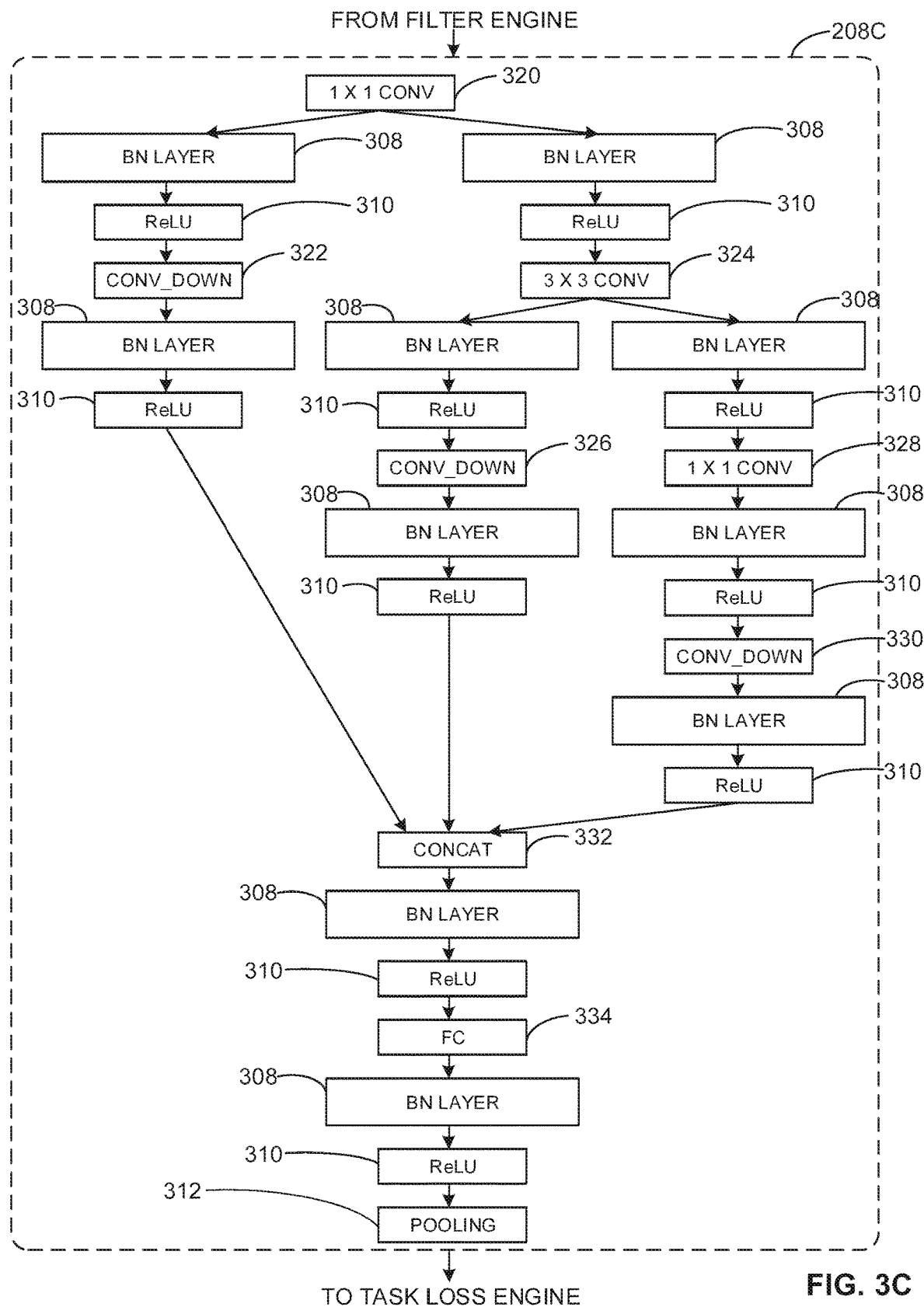

FIGS. 3A-3C illustrate example sibling semantic blocks 208 that implement the example sibling semantic engine 110 illustrated in FIGS. 1 and 2. In the illustrated example of FIG. 3A, a first sibling semantic block 208A is provided. The sibling semantic block 208A of FIG. 3A is utilized for whole face region tasks, such as gender. The illustrated example provides a unique order of convolution layers including a 1×1 filter 302, a 7×7 filter 304, a second 1×1 filter 306 and a final pooling layer 312. Additionally, following the succession of each convolution layer or filter, there is a subsequent Batch Normalization (BN) layer 308 and a Rectified Linear Unit (ReLU) layer 310. The BN layers speed up training of convolutional neural networks and reduce the sensitivity to network initialization. The ReLU layers retain the phase information but eliminate the modulus information when the phase of a response is negative. The pooling layer 312 at the end of the sibling semantic block 208A reduces the media data (e.g., an image) to an activations volume of size.

FIG. 3B illustrates an example sibling semantic block 208B that deals with tasks that include style, affine transformation, color and coarse texture changes. For example, the sibling semantic block 208B would be utilized for a glasses recognition task. The example sibling semantic block includes a first 1×1 filter 310, followed by a 3×3 filter 312 and a 5×5 filter 314. The 3×3 filter 312 and the 5×5 filter 314 each pass through a BN layer 308 and a ReLU layer 310 prior to a concatenate layer 316 which merges the feature maps from both the 3×3 filter 312 and the 5×5 filter 314. The sibling semantic block 208B also includes a final 1×1 filter 318 prior to the final sequence of RN layer 308, ReLU layer 310, and pooling layer 312. In the illustrated example each layer, 310, 314, 316, 318 is followed by a sequence of BN layer 308 and ReLU layer 310, with the exception of the final 1×1 filter 318, which includes a final pooling layer 312.

FIG. 3C illustrates an example sibling semantic block 208C that is more complex than the prior sibling semantic blocks 208A-208B because it deals with distinctions of emotion. As such, the sibling semantic block 208C includes a dense structure that starts with a first 1×1 filter 320 followed by a first convolve down layer 322 and a 3×3 filter 324. The 3×3 filter 324 proceeds into a second convolve down layer 326 and a second 1×1 filter 328. The second 1×1 filter 328 is followed by a third convolve down layer 330, which proceeds to a concatenate layer 332 that merges the first convolve down layer 322, the second convolve down layer 326 and the third convolve down layer 330. The concatenate layer 332 proceeds to a fully connected layer 334 before the final pooling layer 312. In the illustrated example each layer, 320, 322, 324, 326, 328, 330, 332, 334 is followed by a sequence of BN layer 308 and ReLU layer 310, with the exception of the fully connected layer 334 layer, which includes a final pooling layer 312.

Figure 4:
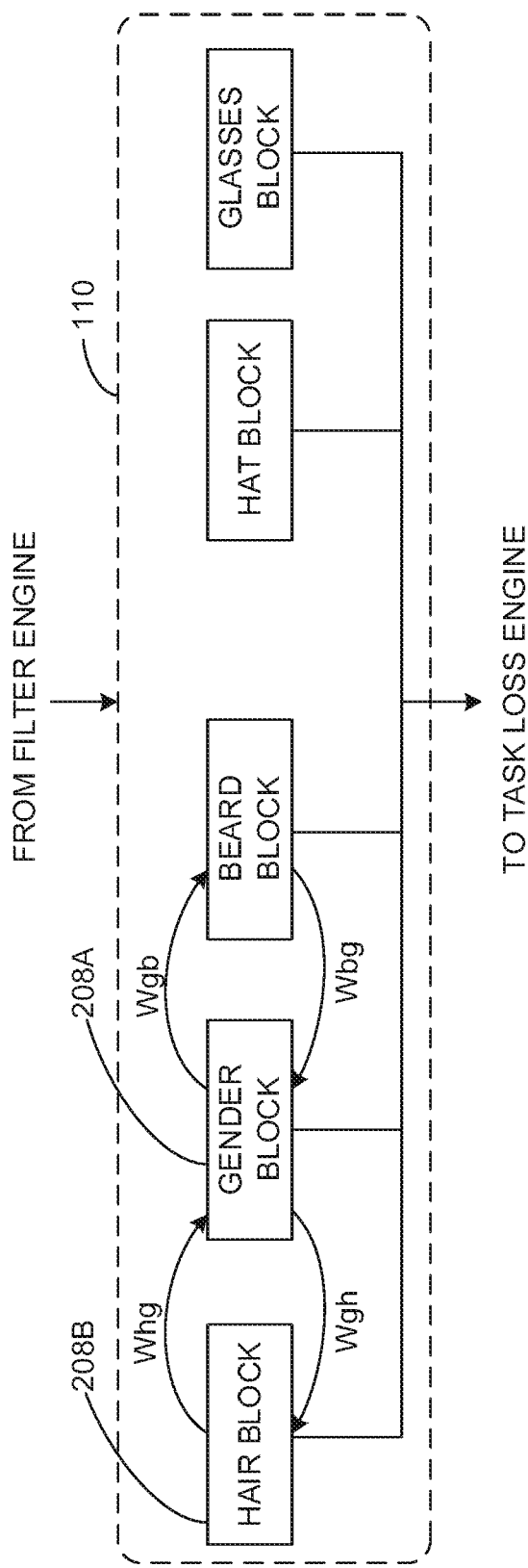
FIG. 4 illustrates and example weighting structure that may be implemented by the sibling semantic blocks of FIGS. 3A-3C.

FIG. 4 illustrates and example weighting structure that may be implemented by the sibling semantic blocks 208A-208C of FIGS. 3A-3C. In the illustrated example, sibling semantic block 208A is processing a feature map to determine gender and sibling semantic block 208B is processing a feature map for hair. In some examples, the weights associated with certain features are sent and received between the different sibling semantic blocks 208. This is beneficial because the sibling semantic blocks are processing the feature maps simultaneously and the weights can increase the efficiency and accuracy of the results. For example, sibling semantic block 208B may identify short hair which is typically associated with males, and may pass this information to sibling semantic block 208A to assist in processing the feature map to determine gender. This structure is utilized for various facial recognition tasks to increase the accuracy of the results, reduces processing power and reduces processing cycles.

While an example manner of implementing the analysis engine 102 of FIG. 1 is illustrated in FIG. 2, one or more of the elements, processes and/or devices illustrated in FIG. 2 may be combined, divided, re-arranged, omitted, eliminated and/or implemented in any other way. Further, the example controller 106, the example filter engine 108, the example sibling semantic engine 110, the example task loss engine 112, the example classification engine 114, the example report generator 116 and/or, more generally, the example analysis engine 102 of FIG. 2 may be implemented by hardware, software, firmware and/or any combination of hardware, software and/or firmware. Thus, for example, any of the example controller 106, the example filter engine 108, the example sibling semantic engine 110, the example task loss engine 112, the example classification engine 114, the example report generator 116 and/or, more generally, the example analysis engine 102 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, controller 106, the example filter engine 108, the example sibling semantic engine 110, the example task loss engine 112, the example classification engine 114, the example report generator 116 and/or, more generally, the example analysis engine 102 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example analysis engine 102 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
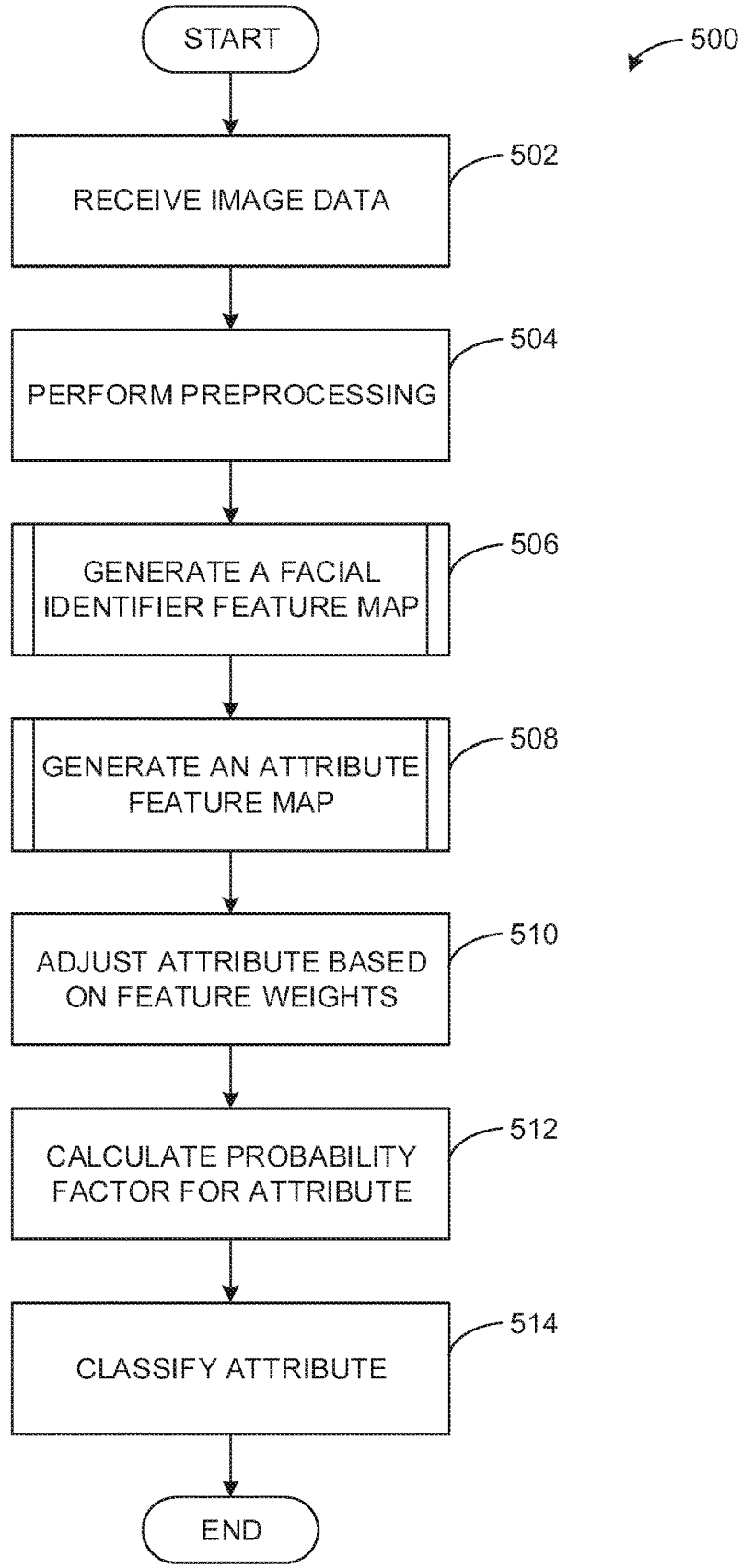
FIG. 5 is a flow diagram representing example processes that may be implemented as machine-readable instructions that may be executed to implement the example analysis engine of FIG. 1 to perform facial analysis for multi-task recognition.
Figure 6:
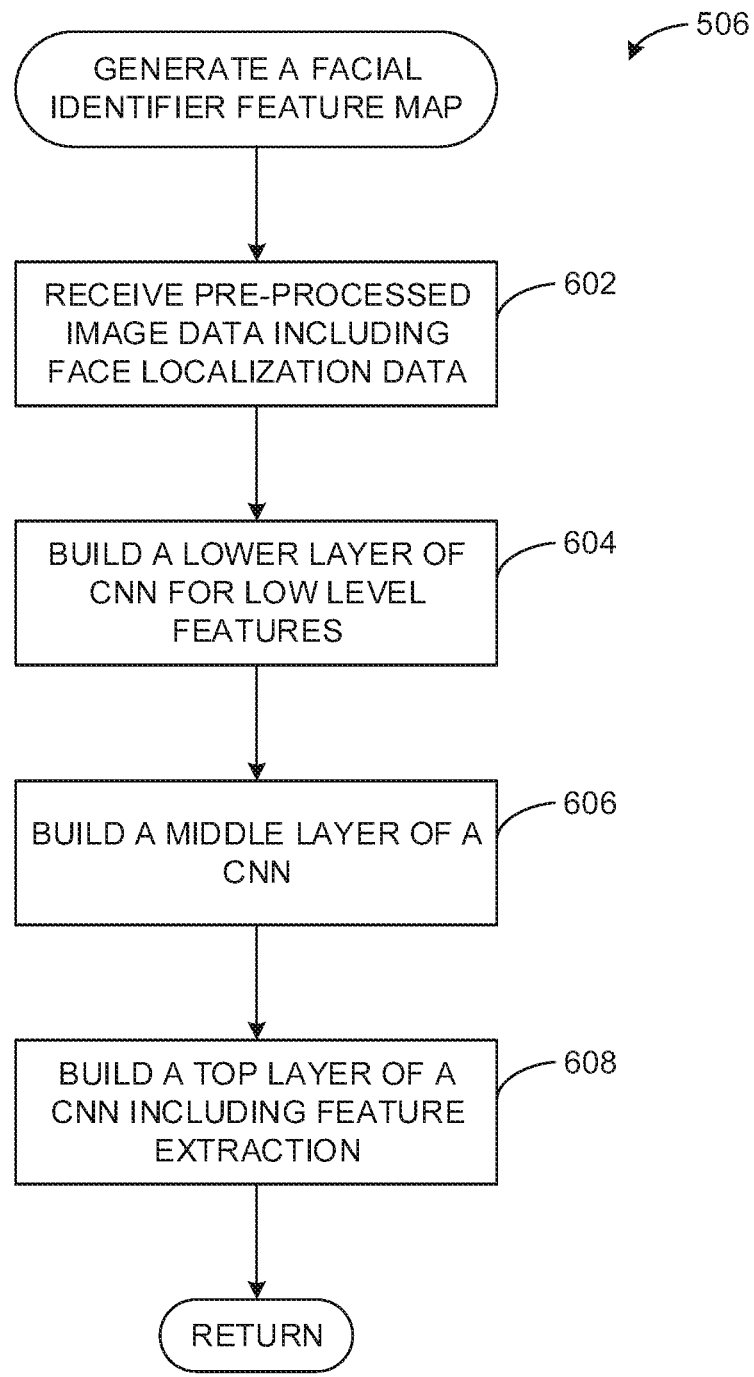
FIG. 6 is a flowchart representing example processes that may be implemented as machine-readable instructions that may be executed to implement the example filter engine of FIG. 2 to perform the processes of FIG. 5 to generate a facial identifier feature map.
Figure 7:
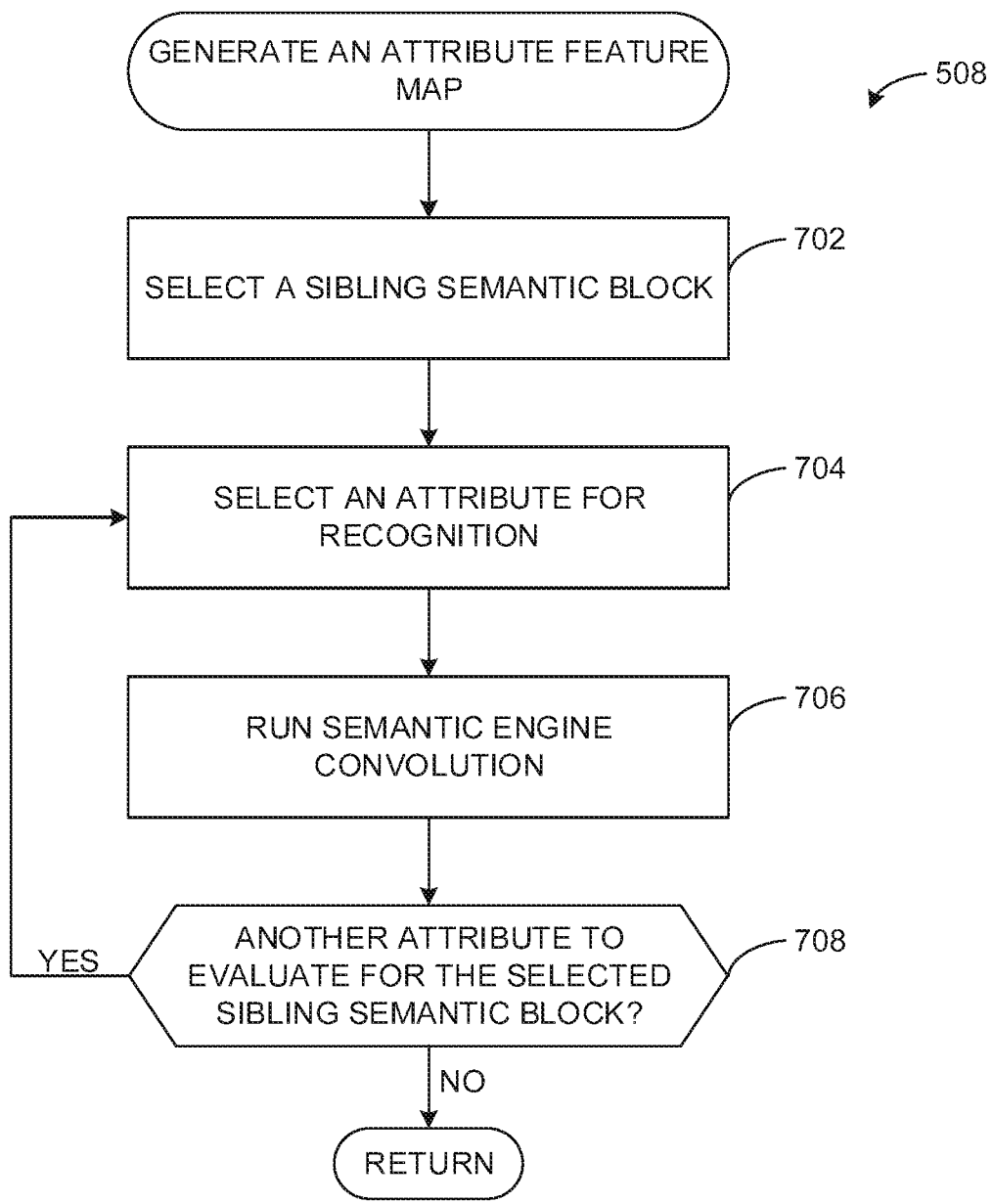
FIG. 7 is a flowchart representing example processes that may be implemented as machine-readable instructions that may be executed to implement the example sibling semantic engine of FIG. 2 to perform the processes of FIG. 5 to generate an attribute feature map.
Figure 8:
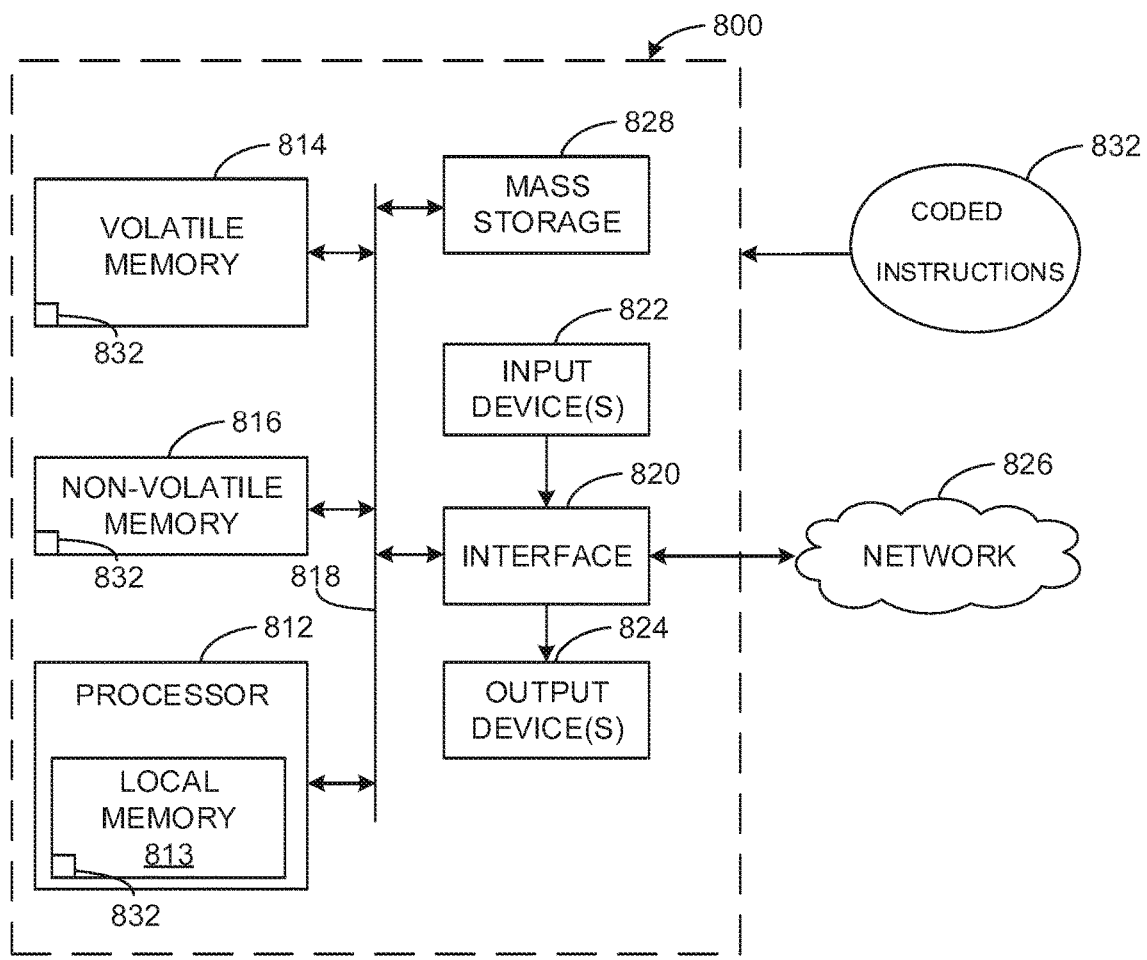
FIG. 8 illustrates an example processor system structured to execute the example instructions of FIGS. 5, 6 and 7 to implement the example analysis engine of FIG. 1.

Flowcharts representative of example hardware logic or machine readable instructions for implementing the analysis engine 102 of FIG. 2 are shown in FIGS. 5-7. The machine readable instructions may be a program or portion of a program for execution by a processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5-7, many other methods of implementing the example analysis engine 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

FIG. 5 is a flow diagram representing example processes 500 that may be implemented as machine-readable instructions that may be executed to implement the example analysis engine 102 of FIG. 1 to perform facial analysis for multi-task recognition. The example process 500 begins when the controller 106 receives image data. The controller 106 performs pre-processing (block 504). In some examples, the controller 106 does not perform pre-processing and sends the image data directly to the filter engine 108. The filter engine 108 generates a facial identifier feature map (block 506). The facial identifier feature map identifies specific facial features such as eyes, hair, mouth, etc. The sibling semantic engine 110 generates an attribute feature map (block 508). For example, the sibling semantic engine 110 generates a feature map for a specific facial recognition task (e.g., has hat, glasses, gender, etc.). The sibling semantic engine 110 adjust attribute based on feature weights (block 510). For example, the sibling semantic engine 110 may adjust an attribute based on feature weights received from other sibling semantic blocks. The task loss engine 112 calculates a probability factor for attribute (block 512). For example, the task loss engine 112 may determine a loss value associated with the attribute in the feature map from the sibling semantic engine 110. The classification engine 114 classifies the attribute (block 514).

FIG. 6 is a flowchart representing example processes that may be implemented as machine-readable instructions that may be executed to implement the example filter engine 108 of FIG. 2 to perform the processes of FIG. 5 to generate a facial identifier feature map. The filter engine 108 receives pre-processed image data including face localization data (block 602). The filter engine 108 builds a lower layer of a CNN for low level features (block 604). The filter engine 108 builds a middle layer of a CNN (block 606). The filter engine 108 builds a top layer of a CNN including feature extraction (block 608). The process then returns to block 406.

FIG. 7 is a flowchart representing example processes that may be implemented as machine-readable instructions that may be executed to implement the example sibling semantic engine 110 of FIG. 2 to perform the processes of FIG. 5 to generate an attribute feature map. The sibling semantic engine 110 selects a sibling semantic block (block 702). For example, the sibling semantic engine 110 may select one or all of the sibling semantic blocks 208A-208C. The sibling semantic engine 110 selects an attribute for recognition (block 704). For example, the sibling semantic engine 110 selects an attribute for recognition based on the feature maps from the filter engine 108. The sibling semantic engine 110 runs semantic engine convolution (block 706). For example, the sibling semantic engine processes the feature maps using the sibling semantic blocks 208A-208C illustrated in FIGS. 3A-3C. It is then determined if there is another attribute to evaluate for the selected sibling semantic block (block 708). For example, the sibling semantic engine 110 determines if another attribute similar to an attribute that was just processed using a certain semantic block 208 is to be evaluated. If there is another attribute to be evaluated by a sibling semantic block 208 that was in use, the process returns to block 704. If there is no attribute, the process return to block 408.

FIG. 6 is a block diagram of an example processor platform 800 structured to execute the instructions of FIGS. 5-7 to implement the analysis engine 102 of FIG. 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the analysis engine 102.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5-7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that perform facial analysis for multi-task recognition. The efficient single CNN disclosed herein reduces the number of parameters rather than combing multiple networks, which increases processing efficiency, increases accuracy of results, and accelerates convergence.

Example methods, systems, articles of manufacture and apparatus for multi-task recognition using neural networks are disclosed herein. Some such examples and combinations thereof include the following.

Example 1 includes an apparatus to perform multi-task recognition comprising a filter engine to generate a facial identifier feature map based on image data, the facial identifier feature map to identify a face within the image data, a sibling semantic engine to process the facial identifier feature map to generate an attribute feature map associated with a facial attribute, a task loss engine to calculate a probability factor for the attribute, the probability factor identifying the facial attribute, and a report generator to generate a report indicative of a classification of the facial attribute.

Example 2 includes the apparatus as defined in example 1, wherein the filter engine to generate the facial identifier map using a phase-convolution engine, a phase-residual engine and an inception-residual engine.

Example 3 includes the apparatus as defined in example 1, wherein the sibling semantic engine to generate the attribute feature map using at least one of a face semantic engine, a local-part semantic engine or a hybrid coupled semantic engine.

Example 4 includes the apparatus as defined in example 3, wherein the face semantic engine to convolve the facial identifier feature map to identify at least gender or age.

Example 5 includes the apparatus as defined in example 4, wherein the face semantic engine to convolve the facial identifier map using at least one of a 1×1 filter or 7×7 filter.

Example 6 includes the apparatus as defined in example 3, wherein the local-part semantic engine to convolve the facial identifier map to identify accessory attributes.

Example 7 includes the apparatus as defined in example 6, wherein the local-semantic engine to convolve the facial identifier map using at least one of a 1×1 filter, 3×3 filter, 5×5 filter or a concatenate layer.

Example 8 includes the apparatus as defined in example 3, wherein the hybrid coupled semantic engine to convolve the facial identifier map to identify emotions.

Example 9 includes the apparatus as defined in example 6, wherein the hybrid coupled engine to convolve the facial identifier map using at least one of a 1×1 filter, 3×3 filter, convolve down, a fully connected layer or a concatenate layer.

Example 10 includes a method to perform multi-task recognition comprising generating a facial identifier feature map based on image data, the facial identifier feature map to identify a face within the image data, processing the facial identifier feature map to generate an attribute feature map associated with a facial attribute, calculating a probability factor for the attribute, the probability factor identifying the facial attribute, and generating a report indicative of a classification of the facial attribute.

Example 11 includes the method as defined in example 10, wherein generating the facial feature map includes using a phase-convolution engine, a phase-residual engine and an inception-residual engine.

Example 12 includes the method as defined in example 10, wherein generating the attribute feature map includes using at least one of a face semantic engine, a local-part semantic engine or a hybrid coupled semantic engine.

Example 13 includes the method as defined in example 12, wherein the face semantic engine to convolve the facial identifier feature map to identify at least gender or age.

Example 14 includes the method as defined in example 12, wherein the local-part semantic engine to convolve the facial identifier map to identify accessory attributes.

Example 15 includes the method as defined in example 12, wherein the hybrid coupled semantic engine to convolve the facial identifier map to identify emotions.

Example 16 includes a non-transitory computer readable storage medium comprising instructions which, when executed, cause a machine to at least: generate a facial identifier feature map based on image data, the facial identifier feature map to identify a face within the image data, process the facial identifier feature map to generate an attribute feature map associated with a facial attribute, calculate a probability factor for the attribute, the probability factor identifying the facial attribute, and generate a report indicative of a classification of the facial attribute.

Example 17 includes the non-transitory computer readable storage medium as defined in example 16, wherein the sibling semantic engine to generate the attribute feature map using at least one of a face semantic engine, a local-part semantic engine or a hybrid coupled semantic engine.

Example 18 includes the non-transitory computer readable storage medium as defined in example 17, wherein the face semantic engine to convolve the facial identifier feature map to identify at least gender or age.

Example 19 includes the non-transitory computer readable storage medium as defined in example 17, wherein the local-part semantic engine to convolve the facial identifier map to identify accessory attributes.

Example 20 includes the non-transitory computer readable storage medium as defined in example 17, wherein the hybrid coupled semantic engine to convolve the facial identifier map to identify emotions.

Example 21 includes an apparatus to perform multi-task recognition comprising means for generating a facial identifier feature map to generate a facial identifier feature map based on image data, the facial identifier feature map to identify a face within the image data, means for processing the facial identifier feature map to generate an attribute feature map associated with a facial attribute, means for calculating a probability factor to calculate a probability factor for the attribute, the probability factor identifying the facial attribute, and means for generating a report to generate a report indicative of a classification of the facial attribute.

Example 22 includes the apparatus as defined in example 21, wherein the means for processing the facial identifier feature map includes at least one of a face semantic engine, a local-part semantic engine or a hybrid coupled semantic engine.

Example 23 includes the apparatus as defined in example 22, wherein the face semantic engine to convolve the facial identifier feature map to identify at least gender or age.

Example 24 includes the apparatus as defined in example 22, wherein the local-part semantic engine to convolve the facial identifier map to identify accessory attributes.

Example 25 includes the apparatus as defined in example 22, wherein the hybrid coupled semantic engine to convolve the facial identifier map to identify emotions.

Example 26 includes the apparatus as defined in example 21, wherein the means for generating the facial feature map includes a phase-convolution engine, a phase-residual engine and an inception-residual engine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to perform multi-task recognition comprising:
    a filter engine to generate a facial identifier feature map based on image data, the facial identifier feature map to identify facial features of a face within the image data, the filter engine including:
        a first block circuit to reduce redundant filters corresponding to lower layers of a neural network;
        a second block circuit to learn a residual function with reference to a layer input;
        a third block circuit to broaden a network width and provide a multi-scale feature extraction property to increase emotion recognition;
    a sibling semantic engine to generate attribute feature maps based on the facial identifier feature map, the attribute feature maps associated with facial attributes;
    a task loss engine to calculate probability factors for the respective facial attributes of the attribute feature maps, the probability factors identifying the respective facial attributes;
    a classification engine to classify an emotion based on the probability factors for the respective facial attributes; and
    a report generator to generate a report indicative of the classified emotion.

2. The apparatus of claim 1, wherein the first block circuit is a phase-convolution engine, the second block circuit is a phase-residual engine, and the first block circuit is an inception-residual engine.

3. The apparatus of claim 1, wherein the sibling semantic engine is to generate the attribute feature maps using at least one of a face semantic engine, a local-part semantic engine or a hybrid coupled semantic engine.

4. The apparatus of claim 3, wherein the face semantic engine is to convolve the facial identifier feature map to identify at least one of gender or age.

5. The apparatus of claim 4, wherein the face semantic engine is to convolve the facial identifier map using at least one of a 1×1 filter or 7×7 filter.

6. The apparatus of claim 3, wherein the local-part semantic engine is to convolve the facial identifier map to identify accessory attributes using at least one of a 1×1 filter, 3×3 filter, 5×5 filter or a concatenate layer.

7. The apparatus of claim 3, wherein the hybrid coupled semantic engine is to convolve the facial identifier map to identify the emotion using at least one of a 1×1 filter, 3×3 filter, convolve down, a fully connected layer or a concatenate layer.

8. The apparatus of claim 1, wherein the sibling semantic engine is to generate the attribute feature maps by:

selecting a sibling semantic block; and
running a semantic engine convolution to process the facial identifier feature map using the sibling semantic block.

9. The apparatus of claim 1, wherein the attribute feature maps include a first attribute feature map and the facial attributes are first facial attributes, wherein:
the sibling semantic engine is to generate a second attribute feature maps based on the facial identifier feature map, the second attribute feature maps associated with second facial attributes; and
the report generator to include a classification of the second attributes in the report.

10. A method to perform multi-task recognition comprising:
building, by executing an instruction with at least one processor, layers of a neural network to generate a facial identifier feature map based on image data, the facial identifier feature map to identify facial features of a face within the image data, the building of the layers including:
reducing redundant filters corresponding to lower layers of the neural network;
learning a residual function reference to a layer input; and
broaden a network width and provide a multi-scale feature extraction property to increase emotion recognition;
generating, by executing an instruction with the at least one processor, attribute feature maps based on the facial identifier feature map, the attribute feature maps associated with facial attributes;
calculating, by executing an instruction with the at least one processor, probability factors for respective ones of the facial attributes of the attribute feature map, the probability factors identifying the respective facial attributes;
classifying, by executing an instruction with the at least one processor, an emotion based on the probability factors for the respective facial attributes; and
generating, by executing an instruction with the at least one processor, a report indicative of the classified emotion.

11. The method of claim 10, wherein generating the facial feature map includes using a phase-convolution engine to reduce the redundant filters, a phase-residual engine to learn the residual function, and an inception-residual engine to broaden the network width.

12. The method of claim 10, wherein generating the attribute feature maps includes using at least one of a face semantic engine, a local-part semantic engine or a hybrid coupled semantic engine.

13. The method of claim 12, further including convolving the facial identifier feature map using the face semantic engine to identify at least one of gender or age.

14. The method of claim 12, further including convolving the facial identifier map to using the local-part semantic engine identify accessory attributes.

15. The method of claim 12, further including convolving the facial identifier map using the hybrid coupled semantic engine to identify the emotion.

16. A non-transitory computer readable storage medium comprising instructions which, when executed, cause a machine to at least:
build layers of a neural network to generate a facial identifier feature map based on image data, the facial identifier feature map to identify facial features of a face within the image data, the building of the layers including:
reducing redundant filters corresponding to lower layers of the neural network;
learning a residual function reference to a layer input; and
broaden a network width and provide a multi-scale feature extraction property to increase emotion recognition;
generate attribute feature maps using the facial identifier feature map, the attribute feature maps associated with facial attributes;
calculate probability factors for the respective facial attributes of the attribute feature map, the probability factors identifying the respective facial attributes;
classify an emotion based on the probability factors for the respective facial attributes; and
generate a report indicative of the classified emotion.

17. The non-transitory computer readable storage medium of claim 16, wherein the instructions cause the machine to generate the attribute feature maps using at least one of a face semantic engine, a local-part semantic engine or a hybrid coupled semantic engine.

18. The non-transitory computer readable storage medium of claim 17, wherein the instructions cause the machine to convolve the facial identifier feature map to identify at least one of gender or age.

19. The non-transitory computer readable storage medium of claim 17, wherein the instructions cause the machine to convolve the facial identifier map to identify accessory attributes.

20. The non-transitory computer readable storage medium of claim 17, wherein the instruction cause the machine to convolve the facial identifier map to identify the emotion.

21. An apparatus to perform multi-task recognition comprising:
means for building layers of a neural network to generate a facial identifier feature map to generate a facial identifier feature map based on image data, the facial identifier feature map to identify a face within the image data, the means for building layers to build the layers by:
reducing redundant filters corresponding to lower layers of the neural network;
learning a residual function reference to a layer input; and
broaden a network width and provide a multi-scale feature extraction property to increase emotion recognition;
means for generating attribute feature maps based on the facial identifier feature map, the attribute feature maps associated with facial attributes;
means for calculating probability factors for the respective facial attributes of the attribute feature map, the probability factors identifying the respective facial attributes;
means for classifying an emotion based on the probability factors for the respective facial attributes; and
means for generating a report to generate a report indicative of the classified emotion.

22. The apparatus of claim 21, wherein the means for processing the facial identifier feature map includes at least one of a face semantic engine, a local-part semantic engine or a hybrid coupled semantic engine.

23. The apparatus of claim 22, wherein the means for generating the attribute feature maps is to convolve the facial identifier feature map to identify at least one of gender or age.

24. The apparatus of claim 22, wherein the means for generating the attribute feature maps is to convolve the facial identifier map to identify accessory attributes.

25. The apparatus of claim 22, wherein the means for generating the attribute feature maps is to convolve the facial identifier map to identify the emotion.

* * * * *